United States Patent Office 3,054,950
Patented Sept. 18, 1962

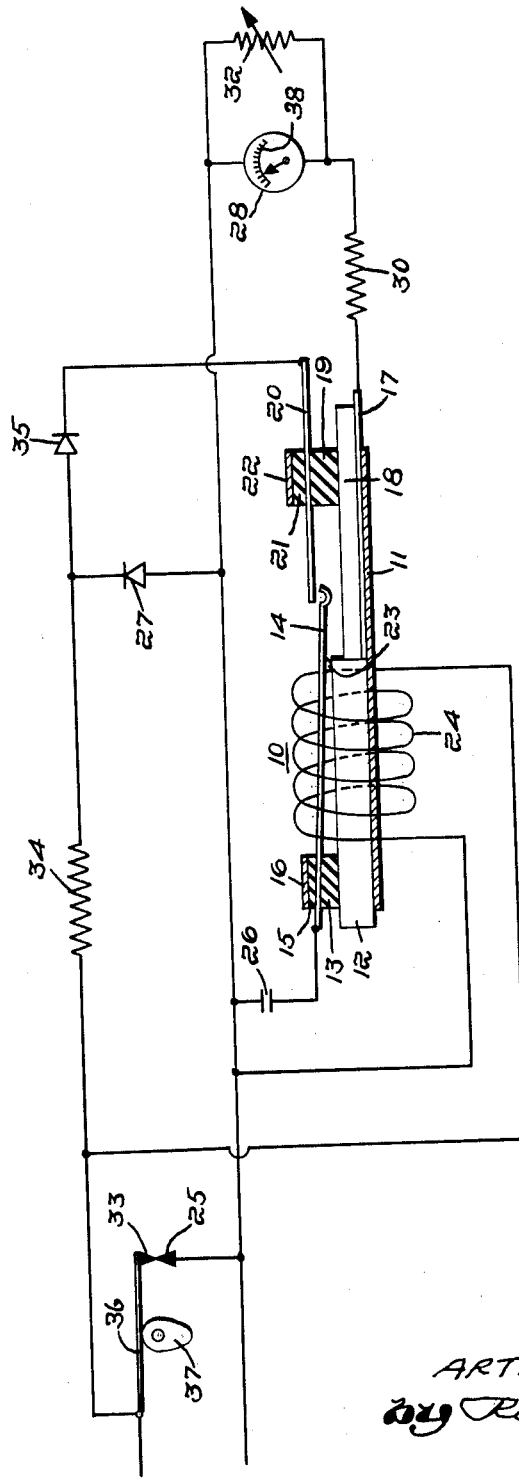

3,054,950
REVOLUTION INDICATING SYSTEMS
Arthur F. Cann, Winchester, Mass., assignor to Stevens-Arnold Inc., Boston, Mass., a corporation of Massachusetts
Filed May 21, 1959, Ser. No. 814,900
2 Claims. (Cl. 324—70)

This invention relates to revolution indicators for internal combustion engines having ignition systems.

Electrical revolution indicators for internal combustion engines having ignition systems are widely used. A typical indicator of this type uses a single-pole, double-throw switch actuated by the flow of current through a coil connected across the ignition points of an ignition system of an engine, the speed of which is to be measured. The switch is spring biased to normally close a circuit connecting a capacitor across a voltmeter. When the ignition points open, the flow of current through the coil causes it to operate its switch to disconnect the capacitor from the voltmeter, and to connect the capacitor across the battery of the ignition system. The capacitor is charged by the battery when the ignition points open, and the voltage across the capacitor which is proportional to the speed of the engine, is indicated by the voltmeter when the points close.

Such a revolution indicating system will not operate satisfactorily with an engine having a magneto ignition system. When the points of such a magneto ignition system open, the polarity of the current through a coil connected across the points does not continue in the same direction as it does in a coil connected across the points of a battery ignition system, but reverses after the initial opening of the points. When the reversing current crosses the zero axis, the usual switch is returned by its biasing spring to its initial position, connecting the capacitor across the voltmeter. Following this, the reverse current causes the switch to again connect the capacitor across the voltage source. Then when the current finally decreases to and stays at zero, the switch again connects the capacitor across the voltmeter. Thus, there are two cycles of operation between the opening and closing of the points, but this cannot be used to accurately indicate speed since the opposite polarity waves of the current do not have the same shape and value so that operation is erratic.

A feature of this invention is that it uses a magnetically polarized switch for connecting the capacitor of such a system normally across a voltmeter, and for connecting the capacitor to its charging source when the ignition points open. Undesired reversal of current through the actuating coil of such a switch cannot operate the switch to connect the capacitor across its charging source when the current reverses.

Another feature of this invention is that current from the magneto when the ignition points open, is rectified to provide the capacitor charging voltage which is stabilized to provide a constant charging voltage.

An object of this invention is to provide an electrical revolution indicating system for an internal combustion engine having magneto ignition.

Another object of this invention is to use a magnetically polarized switch in an electrical revolution indicating system for an internal combustion engine having an electrical ignition system.

Another object of this invention is to rectify and stabilize the current from a magneto, and to use it to charge a capacitor in an electrical revolution indicating system for an internal combustion engine using the magneto for ignition.

This invention will now be described with reference to the annexed drawing which is a simplified circuit schematic of one embodiment of the invention, with portions of the switch used being shown in section.

A switch 10 has a brass base 11 with a bronze block 12 at one end, on which is an insulating spacer 13. The fixed end of a reed 14 of magnetic spring metal is clamped between the spacer 13 and another insulating spacer 15 by a crimped-over upper portion 16 of the base 11.

At the other end of the base 11 is a brass contact strip 17 on which there is a bar permanent magnet 18. On the magnet 18 there is an insulating spacer 19. A contact strip 20 of brass is clamped between the spacer 19 and another insulating spacer 21 by another crimped-over upper portion 22 of the base 11.

The free end of the reed 14 extends over the magnet 18 and normally is attracted by the magnet so that a contact 23 on the under side of the reed is in contact with the block 12. The inner end of the contact strip 17 is in contact with the block 12. The inner end of the contact strip 20 overlaps the free end of the reed 14, and normally is spaced from it. A coil 24 is coiled around the reed 14 and the base 11, and is connected at its ends to ignition points 25 and 33 of a magneto ignition system of an internal combustion engine which is not shown.

The ignition point 25 is connected to one terminal of capacitor 26, to the anode of Zener diode 27, and to one terminal of voltmeter 28. The other terminal of the voltmeter is connected through resistor 30 to the terminal strip 17. A variable resistor 32 is shunted across the voltmeter.

The ignition point 33 is connected through resistor 34 to the cathode of the diode 27 and to the anode of rectifier diode 35, the cathode of which is connected to the strip 20.

The ignition point 33 is on a spring strip 36 which is deflected by a magneto driven cam 37 to move the point 33 away from the point 25 for firing a cylinder of the associated engine.

The capacitor 26 is normally connected by the reed 14, the block 12, the terminal strip 17 and the resistor 30 across the voltmeter 28.

The Zener diode 27 is a well known voltage regulator having a predetermined, selected, reverse flow breakdown voltage.

When the ignition points 25 and 33 separate, current from the magneto flows through the coil 24, causing the reed 14 to be magnetized in a direction to be repelled by the magnet 18 so that the free end of the reed moves against the contact strip 20, the contact 23 on the reed leaving the block 12. The contact 23 leaving the block 12 disconnects the reed 14 from the voltmeter 28, and connects the reed through the contact strip 20, the diode 35 and the resistor 34 to the ignition point 33. A circuit is thus closed connecting the capacitor 26 across the now separated ignition points 25 and 33. This circuit includes the ignition point 25, the reed 14, the contact strip 20, the diode 35, the resistor 34 and the ignition point 33. When the current through the coil reverses after the points separate, the free end of the reed returns to its initial position and remains there until the points close and again separate. At zero current and at current opposite in polarity to that which caused the free end of the reed to be repelled by the magnet, the free end of the reed is attracted to the magnet, opening the circuit connecting the capacitor across the voltage source, and closing the circuit connecting the capacitor across the voltmeter.

The diode 35 rectifies the current from the magneto to provide D.C. for charging the capacitor 26 when the ignition points separate. Since the voltage of the current from the magneto is irregular, the Zener diode 27 draws current through the resistor 34, and limits the voltage at which the capacitor is charged to the breakdown voltage of the Zener diode.

When the ignition points close again, the diode 35 prevents the capacitor 26 from discharging through the closed ignition points or through the Zener diode 27.

The voltmeter 28 has a scale 38 calibrated to indicate revolutions per minute.

The resistor 30 limits current surge through the reed contact 23 and the block 12. The variable resistor 32 is used for adjusting the calibration of the voltmeter.

What I claim is:

1. In a revolution indicating system for an internal combustion engine having an electrical ignition system with a pair of ignition means between which current can flow, having a voltmeter, having a capacitor, and having a D.C. source for charging said capacitor, the improvement comprising a cantilever supported reed of spring metal, a first contact on one side of the free end of said reed, a second contact of non-magnetic metal on the opposite side of said free end of said reed, a permanent magnet normally biasing said free end of said reed against said first contact, circuit connections connecting said first contact, said reed, said capacitor and said voltmeter in series, a coil around said reed, circuit connections connecting said coil across said points, and circuit connections connecting said D.C. source, said reed, said capacitor and said second contact in series when current flow between said ignition means and through said coil, causes said free end of said reed to leave said first contact and to move against said second contact.

2. The invention claimed in claim 1 in which said D.C. source is a diode having a terminal of one polarity connected to one of said ignition means, and in which there is provided a Zener diode having a terminal of the opposite polarity connected to said terminal of said diode, and having a terminal of said one polarity connected to the other of said ignition means.

References Cited in the file of this patent

UNITED STATES PATENTS

| | | |
|---|---|---|
| 2,060,721 | Bird | Nov. 10, 1936 |
| 2,108,014 | Jones | Feb. 8, 1938 |
| 2,473,542 | Philpott | June 21, 1949 |
| 2,929,022 | Carpenter | Mar. 15, 1960 |
| 2,929,992 | Carter | Mar. 22, 1960 |

OTHER REFERENCES

"Auto Tachometer Uses Transistor," by Jane Cowan, Electronics, August 15, 1958, page 92.